United States Patent
Alberts

(10) Patent No.: US 6,709,104 B1
(45) Date of Patent: Mar. 23, 2004

(54) EYEGLASSES AND METHOD OF MAKING SAME FOR THE TREATMENT OF LOW-VISION

(76) Inventor: Davida Charlene Alberts, 1124 Reedsport Pl., DeSoto, TX (US) 75115

(*) Notice: Subject to any disclaimer, the term of this patent is extended or adjusted under 35 U.S.C. 154(b) by 12 days.

(21) Appl. No.: 10/271,893

(22) Filed: Oct. 16, 2002

Related U.S. Application Data

(62) Division of application No. 10/075,535, filed on Feb. 12, 2002, now Pat. No. 6,488,374.

(51) Int. Cl.[7] ............................................... G02C 7/06
(52) U.S. Cl. ........................ 351/168; 351/170; 351/172
(58) Field of Search ................................ 351/168–172

(56) References Cited

U.S. PATENT DOCUMENTS

| | | |
|---|---|---|
| 1,594,059 A | 7/1926 | Hubbell |
| D91,239 S | 10/1933 | Haussman |
| 2,029,479 A | 2/1936 | Hammon |
| 2,029,480 A | 2/1936 | Hammon |
| 2,183,885 A | 12/1939 | Heavyside |
| 4,190,621 A | 2/1980 | Greshes |
| 4,830,482 A * | 5/1989 | Resnikoff .................... 351/172 |
| 4,958,924 A | 9/1990 | Parker |
| 5,044,743 A | 9/1991 | Ting |
| 5,088,809 A | 2/1992 | Portney |
| 5,790,226 A | 8/1998 | Pollak |
| 6,250,759 B1 | 6/2001 | Kerns, Jr. et al. |

* cited by examiner

*Primary Examiner*—Scott J. Sugarman
(74) *Attorney, Agent, or Firm*—L. Bruce Terry; Geoffrey A. Mantooth

(57) ABSTRACT

Eyeglasses for the treatment of low-vision and macular degeneration include a frame for supporting lenses on an occipital dexter side and an occipital sinister side. An occipital dexter lens has a near portion and a distance portion. The near portion has a dioptric power for near vision in a right eye, and the distance portion has a dioptric power for distance vision in the right eye. The optical center of the near portion of the occipital dexter lens is below and on the temporal side of the optical center of the distance portion. An occipital sinister lens similarly has a near portion and a distance portion. The near portion has a dioptric power for near vision in a left eye, and the distance portion has a dioptric power for distance vision in the left eye. The optical center of the near portion of the occipital sinister lens is below and on the temporal side of the optical center of the distance portion.

7 Claims, 1 Drawing Sheet

EYEGLASSES AND METHOD OF MAKING SAME FOR THE TREATMENT OF LOW-VISION

CROSS-REFERENCE TO RELATED APPLICATION

This is a division of application Ser. No. 10/075,535, filed Feb. 12, 2002, now U.S. Pat. No. 6,488,374, hereby incorporated herein by reference.

BACKGROUND OF THE INVENTION

1. Field of the Invention

The present invention is directed to an ophthalmic apparatus, and in particular to bifocal eyeglasses for the treatment of patients with low-vision, and more particularly macular degeneration.

2. Description of the Prior Art

The macula is the small center portion of the light sensitive retina, which is the lining at the back of the eye. Light rays from objects come to a focus in the eye on the retina and are converted to electrical impulses that are interpreted by the brain. The macula is responsible for sharp, straight-ahead vision, which is necessary for functions such as reading, driving, and recognizing faces.

Macular degeneration is a disorder that affects the macula causing decreased visual acuity and possible loss of central vision. The degeneration results from a partial breakdown of the retinal pigment epithelium (RPE). Breakdown of the RPE interferes with the metabolism of the retina, causing thinning of the retina [the "dry" phase of macular degeneration] and may allow these harmful elements from the blood to damage and scar the retina [the "wet" phase of macular degeneration].

This disorder results in the loss of central vision. Peripheral fields are always maintained. Although loss of ability to read and drive may occur from macular degeneration, complete blindness rarely occurs from this disease.

The incidence of macular degeneration increases with each decade over age 50 to almost 15% by the age of 75. There is no known effective prevention. Treatments for macular degeneration include laser photocoagulation, photodynamic therapy. Experimental treatments include surgery, and pharmacologic, radiation, and nutrition therapy.

Patients with macular degeneration should consider ways to maximize their remaining vision so that they can master some daily activities. Optical aids and devices can be recommended by low-vision professionals.

An example of one optical aid that uses peripheral vision to compensate for loss of center vision is the invention described in U.S. Pat. No. 5,088,809 to Portney. Portney uses an intraocular lens, having a converging lens portion and a diverging lens portion, in conjunction with multiple-element spectacles. Thus, to use Portney's invention, the patient must undergo surgery to implant the intraocular lens, and then wear bully, heavy glasses.

Glasses are also used in another treatment for macular degeneration disclosed in U.S. Pat. No. 4,958,924 to Parker. The Parker invention uses eyeglasses alone, but each lens in the eyeglasses has two lens assemblies—a positive power lens and a negative power lens separated by a fixed airspace. With two lenses separated by an airspace, these glasses are also heavy and bulky.

Thus, it should be apparent that a need exists for an improved ophthalmic device for aiding patients with low-vision or macular degeneration wherein the aid uses a single lens for each eye without the need for an intraocular lens.

BRIEF SUMMARY OF INVENTION

To address the above-discussed deficiencies of the prior art, the present invention provides eyeglasses with a single bifocal lens for each eye, where each lens has a distance vision portion and a near vision portion. In each lens, the optical center of the near vision portion is located below a line passing horizontally through the optical center of the distant vision portion, and is located on, the temporal side of a vertical line passing through the optical center of the distance vision portion. The transition between the near portion and the distance portion is preferably smooth.

BRIEF DESCRIPTION OF DRAWINGS

For a more complete understanding of the present invention, reference is now made to the following descriptions taken in conjunction with the accompanying drawings, in which.

DETAILED DESCRIPTION OF INVENTION

Figure 1:
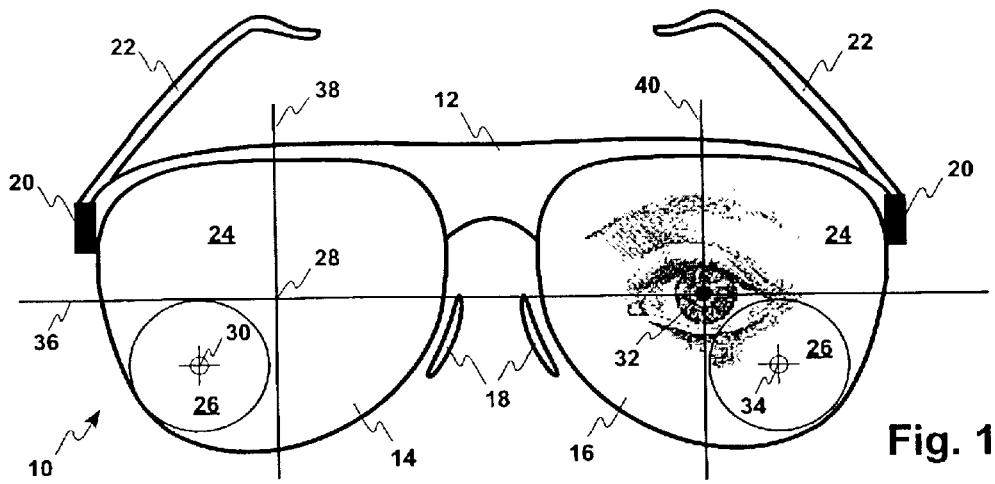
FIG. 1 is a front view of eyeglasses fabricated according to the methods and teachings of the present invention.

With reference now to FIG. 1, there is depicted an ophthalmic device, or eyeglasses 10, in accordance with the method and apparatus of the present invention. As illustrated, eyeglasses 10 include frame 12 for supporting occipital dexter lens 14 in front of a patient's right eye, and occipital sinister lens 16 in front of a patient's left eye. Frame 12 may be a conventional type frame, having nose pads 18, hinges 20 and temples 22 that extend from hinges 20 toward the wearer's ears.

Both occipital dexter lens 14 and occipital sinister lens 16 include distance portions 24 and near portions 26. Distance portions 24 have a dioptric power prescribed for distance vision, and near portions 26 have a dioptric power prescribed for near vision. Dioptric power is a measurement of the refractive (light bending) power of a lens or prism. A diopter is equal to the reciprocal of the focal length measured in meters.

Distance portions 24 may have different dioptric powers for the right and left eye depending upon what each eye in a particular patient needs. Similarly, near portions 26 may have different dioptric powers for the right and left eye.

An optical center, or nodal point, of a lens is the reference point on an optical system's principal axis through which incoming light rays are not bent by the lens or optical surface. In occipital dexter lens 14, distance portion 24 includes optical center 28, and near portion 26 includes optical center 30. Similarly, distance portion 24 of occipital sinister lens 16 includes optical center 32, and sinister side near portion 26 includes optical center 34. Optical centers 28 and 32 will typically coincide with the patient's pupils as the patient normally views a distant object.

FIG. 1 includes reference line 36, which passes horizontally through optical centers 28 and 32 of distance portions 24. According to an important aspect of the present invention, optical centers 30 and 34 of near portions 26 are located below optical centers 28 and 32, respectively, of distance portions 24. Although shown in FIG. 1 at substantially the same height, in some instances optical centers 28 and 32 may be at different heights based upon the location of the patient's pupils.

Reference lines 38 and 40 pass vertically through optical centers 28 and 32, respectively, and divide occipital dexter lens 14 and occipital sinister lens 16 into a nasal side and a temporal side, with the nasal sides toward the nose and the temporal sides toward the temples. According to another important aspect of the present invention, optical centers 30 and 34 of near portions 26 are located on the temporal sides of optical centers 28 and 32 of distance portions 24, respectively.

Thus, in a preferred embodiment, near portions 26 are placed in the lower, outside portions of the right and left lenses. In other embodiments, some area of near portions 26 may extend above reference line 36, or on the nasal sides of reference lines 38 and 40, while optical centers 30 and 34 remain below line 36 and on the temporal sides of lines 38 and 40.

The precise location of optical centers 30 and 34 are determined according to patient preference. The location of the problem with the retina will influence the patient's preferred location of near portions 26. Patients may try glasses with near portions in different locations in order to determine the preferred location. Or, an apparatus such as that shown in U.S. Pat. No. 5,037,193 to Funk may be used to temporarily hold and locate the best position for near portions 26. The Funk invention temporarily clips to an eyeglasses frame and supports a near portion of a bifocal lens on a stick while the patient evaluates the position of near portions 26. Note that near portions 26 may not be located in the same relative positions in occipital dexter lens 14 and occipital sinister lens 16.

Figure 2:
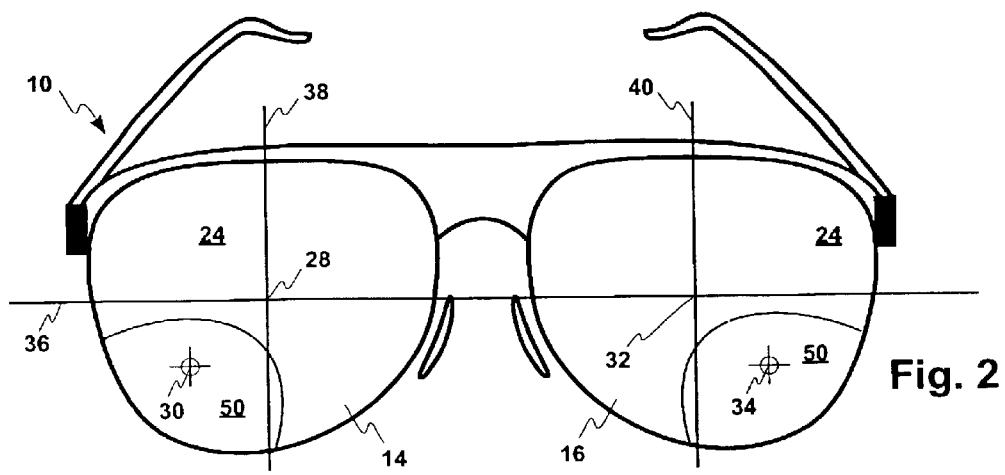
FIG. 2 is an alternative embodiment of the eyeglasses according to the methods and teachings of the present invention.
Figure 3:
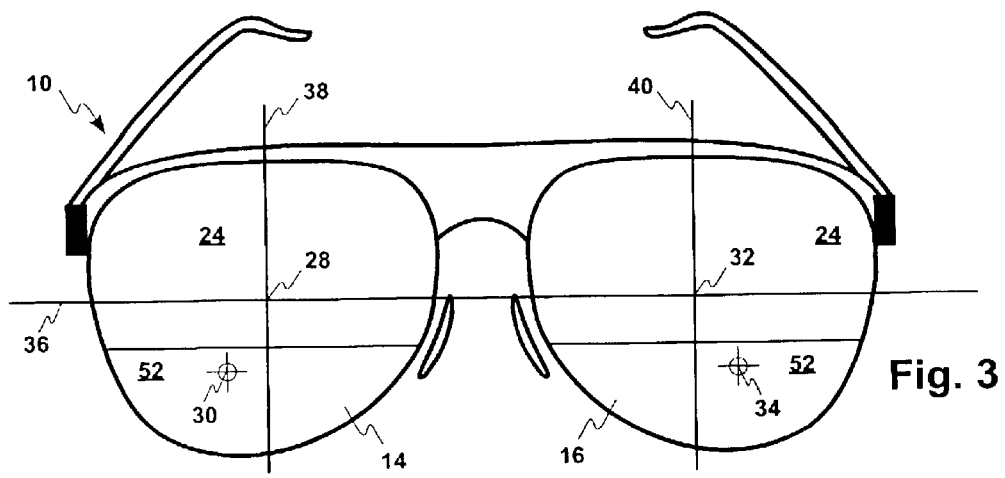
FIG. 3 is yet another embodiment of the eyeglasses according to the methods and teachings of the present invention.

In a preferred embodiment, segments that make near portions 26 are round, and have a diameter from 24 to 30 millimeters. In alternative embodiments, near portions 26 may be any shape, and may intersect the edges of distance portions 24. For example, FIG. 2 shows an alternate embodiment of eyeglasses according to the present invention with oval-shaped near portions 50 having an area that intersects the edge of distance portions 24. In yet another embodiment, which is shown in FIG. 3, eyeglasses according to the present invention may have a Franklin-, or executive-style bifocal lens, having near portions 52. In FIGS. 2 and 3, so optical centers 30 and 34 remain below line 36 and on the temporal sides of lines 38 and 40.

The dioptric power of near portions 26 is preferably plus 4 diopters, but other higher or lower powers may be used according to patient preference.

The transition between near portions 26 and distance portions 24 is preferably a smooth transition, which is known in the art of bifocal fabrication as a fused transition. Molded or blocked bifocals may also be used, but are less desirable because they tend to cause image jump.

In order to fabricate glasses according to the present invention, an optician may start with bifocal lens blanks having a near portion that is outset, or placed toward the temple, from the optical center. Because pupillary distance is 3 to 4 millimeters less when patients use the near vision portions of bifocals, near vision portions are typically inset, and it may be difficult to find blanks with an outset near vision portions. If blanks having a segment outset are not available, the optician may make the occipital dexter lens by starting with an occipital sinister bifocal lens blank having an appropriate segment inset. Similarly, the occipital sinister lens may be made from an occipital dexter bifocal lens blank.

As an example of typical fabrication of the glasses of the present invention, lens blanks sold world-wide by the Essilor company of Paris, France, may be ground, edged, and otherwise fabricated in a conventional manner using machines sold by Gerber Coburn Optical, Inc. South Windsor, Conn. 06074, USA to make eyeglasses in accordance with the present invention.

When using the glasses to read, a patient may gaze down and to the right or left side to read. A magnified image is then cast upon a part of the retina that remains sensitive. Patients report that they are able to read a newspaper at the reading distance from 13 to 16 inches.

Glasses of the present invention are lighter, more aesthetically appealing, and less expensive than the ophthalmic aids in the prior art. Additionally, glasses of the present invention do not require surgery to implant an intraocular lens. These inventive glasses may be fabricated from presently available frames and lens blanks.

The foregoing description of a preferred embodiment of the invention has been present for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. Eyeglasses for the treatment of low-vision, including macular degeneration, comprising:
   a frame for supporting lenses having an occipital dexter side and an occipital sinister side;
   an occipital dexter lens supported by the frame on the occipital dexter side, the occipital dexter lens having a near portion and a distance portion, the near portion having a dioptric power for near vision in a right eye and the distance portion having a dioptric power for distance vision in the right eye, wherein the optical center of the near portion is below and on the temporal side of the optical center of the distance portion; and
   an occipital sinister lens supported by the frame on the occipital sinister side, the occipital sinister lens having a near portion and a distance portion, the near portion having a dioptric power for near vision in a left eye and the distance portion having a dioptric power for distance vision in the left eye, wherein the optical center of the near portion is below and on the temporal side of the optical center of the distance portion.

2. The eyeglasses according to claim 1 wherein an area defining the near portion is below and on the temporal side of the optical center of the distance portion.

3. The eyeglasses according to claim 1 wherein the dioptric power of the near portion is greater than or equal to plus one diopter.

4. The eyeglasses according to claim 1 wherein a transition from the distance portion to the near portion is smooth.

5. The eyeglasses according to claim 1 wherein the near portion is circular.

6. The eyeglasses according to claim 1 wherein the area of the near portion intersects the edge of the distance portion.

7. A method of making eyeglasses for the treatment of macular degeneration comprising the steps of:

selecting an occipital dexter bifocal lens blank having an inset near segment;

fabricating the occipital dexter bifocal lens blank to a predetermined distant vision diopter and a near vision diopter to produce a first fabricated lens;

edging the first fabricated lens to fit the occipital sinister side of an eyeglasses frame;

mounting the first fabricated lens in the occipital sinister side of the eyeglasses frame;

selecting an occipital sinister bifocal lens blank having an inset near segment;

fabricating the occipital sinister bifocal lens blank to a predetermined distant vision diopter and a near vision diopter to produce a second fabricated lens;

edging the second fabricated lens to fit the occipital dexter side of an eyeglasses frame; and mounting the second fabricated lens in the occipital dexter side of the eyeglasses frame.

\* \* \* \* \*